Figure 1:
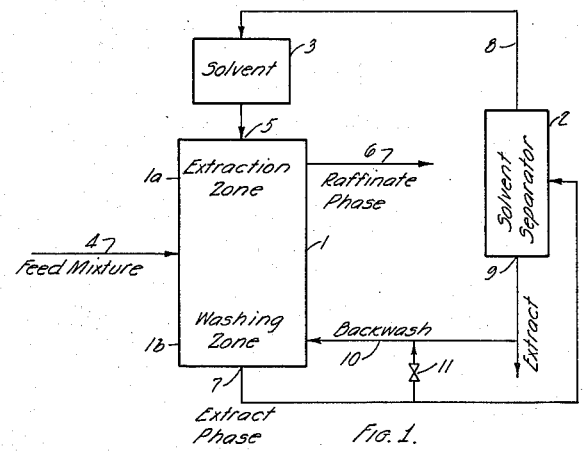

Inventors:
Willem J. D. Van Dijck
Alexander W. J. Mayer

By their Attorney:

Patented May 25, 1937

2,081,721

UNITED STATES PATENT OFFICE 2,081,721

SOLVENT EXTRACTION PROCESS

Willem J. D. van Dijck and Alexander W. J. Mayer, The Hague, Netherlands, assignors to Shell Development Company, San Francisco, Calif., a corporation of Delaware Application June 19, 1935, Serial No. 27,390
In Great Britain June 22, 1934

16 Claims. (Cl. 260—122)

This invention relates to a process for separating a liquid mixture into two components or two groups of components A and B, and is a further development of the process described in the copending application of Willem J. D. van Dijck, Serial No. 669,580, filed May 5, 1933.

It is known to extract certain components from liquid mixtures by extraction with a selective solvent which is at least partially immiscible with one or both of the components of the mixture. The specification of the said application describes and claims an improved process for splitting up such a liquid mixture into its components or groups of components A and B by treating the mixture with a selective extracting agent or selective solvent O, which dissolves A more readily than B, to produce a raffinate or solvent-poor phase which is rich in B, and an extract or solvent-rich phase, which is rich in the solvent O and in A, wherein the said extract phase is washed with a liquid which entirely or substantially consists of A, which liquid may, for brevity's sake, be termed the "backwash", as outlined in the following specification.

According to the present invention it has been discovered that the process of the said application, Serial No. 669,580, can be very successfully applied to the extraction of liquid mixtures containing one or more organic polar compounds, as well as to the extraction of liquid mixtures a component of which is a solid at the temperature of operation. In the separation of mixtures of these types there are two situations in which the process of this invention is especially suitable.

The mixture to be separated may consist of organic substances which differ in the number of polar groups they contain or in the intensity of the polar groups. By "intensity" is meant the group moment of a substituent. (Cf. Debye, "The Dipole Moment and Chemical Structure", 1931, page 28.) Examples of mixtures of the former class are: mono-nitrobenzene and dinitrobenzene, or an organic substance with one and an analogous substance with two OH groups. A mixture of furfural and furfuryl alcohol constitutes also an example of the latter class.

For the separation of such a mixture use can be made of a polarizable solvent which has no dipole-moment, or of a solvent which is slightly polar and in addition polarizable.

Examples of such kinds of solvents are: a high-molecular benzene hydrocarbon, i. e., a benzene hydrocarbon containing aliphatic groups, naphthenes such as cyclohexane or its homologues, the higher olefines (e. g. those present in cracked paraffin wax). Sometimes the cracked wax itself may be used.

From the examples it will be seen that the extraction agents to be used may be hydrocarbons. When arranging them according to increasing polarizability, the following classification is obtained:

1. Saturated aliphatic hydrocarbons with straight chains;
2. Saturated aliphatic hydrocarbons with branched chains;
3. Olefines;
4. Benzene with aliphatic side chains;
5. Benzene;
6. Naphthalene.

The hydrocarbons used as extraction agents are so chosen that they are miscible at least to a limited extent with one of the components or groups of components to be separated. Preferably they should be miscible to a limited extent with both components.

Non-hydrocarbon solvents may, however, also be employed as extraction agents, as more particularly disclosed in this specification.

Our invention may be more fully understood by reference to the annexed drawing, in which:

Fig. 1 is a flow diagram illustrating one embodiment of our invention.

Figure 2:
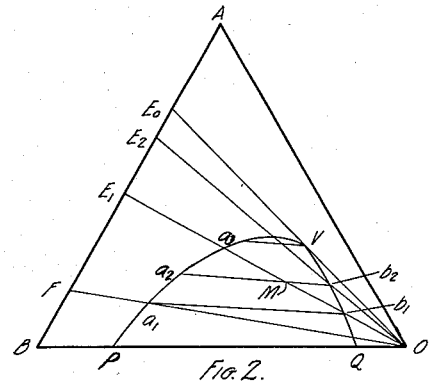
Figure 3:
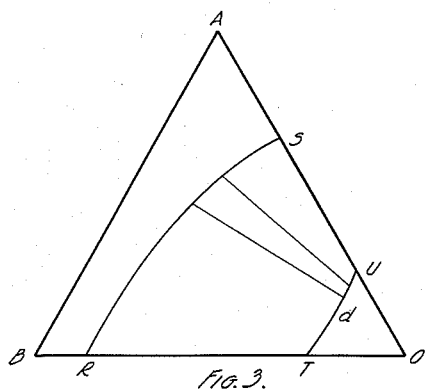

Fig. 2 represents a triangular diagram representing equilibrium condition of a three component system A—B—O at constant temperature in which A and B are the components of the mixture to be treated and O is the extracting agent and in which one of the components A is completely miscible with O whilst the other component B is miscible with O but only to a limited extent, and Fig. 3 represents a similar triangular diagram in which both A and B are miscible with O but only to a limited extent.

Referring to Fig. 1, I is an extraction apparatus, which consists of an extraction zone Ia and a washing zone Ib, which may be portions of the same tower, or may be constructed as separate devices. Either or both of these zones may consist of packed towers, or of numbers of countercurrent washing devices comprising alternate mixing and settling zones, or centrifugal separators, or any other type of apparatus which is suitable for counter-current washing of one liquid phase with another. Moreover, it is not absolutely essential that these two zones be capable of effecting countercurrent treatment, although a more effective separation can generally be obtained by such apparatus. 2 designates a solvent separator or fractionator, and 3 a solvent storage tank, all interconnected with valves, pumps, heat exchangers, and other adjuncts, not shown. The liquid mixture to be separated, consisting of A and B, is introduced at 4 near one end of the extraction zone which, in the apparatus shown, is at an intermediate point of the column constituting both the extraction and washing zones. A solvent O of the type described in the present specification is introduced into the extraction zone 1a through an inlet 5 near the opposite end. Under extracting conditions prevailing in the extraction zone two liquid phases are formed, the raffinate or solvent-poor phase is withdrawn at 6, and the extract or solvent-rich phase flows through the washing zone 1b and is withdrawn at 7. The latter is conducted to the separator 2, from which the solvent is withdrawn and returned to storage 3 through a conduit 8, and the extract, consisting mainly of A, is withdrawn at outlet 9. A portion of this extract is returned to the washing zone 1b through a conduit 10 and introduced as a backwash at a point near the point of discharge 7. In the washing zone the backwash is contacted with the extract phase formed in the extraction zone, preferably in a countercurrent manner, whereby the composition of the extract phase which is withdrawn at 7 is improved, as explained below. If it is not desired to introduce pure extract, the extract may be mixed with extract phase by partially opening valve 11.

The backwash may also be produced from the extract phase after the latter has been more highly concentrated by further treatment under the same or more intensive conditions, such as cooling to lower temperatures, or washing with an auxiliary solvent. Since such treatments often result in a reduction of the solvent content in the extract phase, it is not always necessary to further remove the solvent from the concentrated extract phase. It is to be understood, therefore, that the extract phase withdrawn at 7 may be subjected to any one of a large number of treatments, and that our process is not limited to the situation in which the removal of the solvent is the only treatment to which the extract phase is subjected. Furthermore it is not necessary to use as backwash a part of the treated extract phase which has been produced in the process of the invention. Any liquid which entirely or substantially consists of A is suitable.

While we have illustrated an apparatus in which the extract phase is withdrawn at the bottom of the washing zone, in consequence of its having a greater density than the raffinate phase, it should be noted that when the extract phase is less dense, it will be withdrawn near the top of the extraction apparatus. As pointed out above, the washing zone may consist of a series of treaters. In this case the backwash may be introduced into several stages of the series, or only into the last stage, as desired, and may, therefore, be the product of a stage which is other than the one in which it is used.

The mixture to be separated may contain components which possess an equal number of identical polar groups or which possess an equal number of polar groups of approximately the same strength, e. g. both OH groups, but the molecules may be differently polarizable. An example of such a case is a mixture of a higher alcohol and a phenol. This mixture may be separated with the aid of water. Considering the separation of phenol and dibutyl carbinol, the phenol dissolves more readily into the water; such parts of the dibutyl carbinol as are also dissolved in the extraction agent used are removed by backwashing with liquid phenol.

The separation of a mixture of glycol chlorhydrin and glycol is another example. As extraction agent ether or a higher alcohol can be be used.

The separation of water from any alcohols higher than ethyl alcohol such as, for example, propyl and butyl alcohols may be effected using a lower aliphatic hydrocarbon, such as pentane as the extracting agent, and in the separation of water and alcohols higher than propyl, such as butyl and amyl alcohols, benzene may be used.

The solvent or extracting agent to be used in the process according to this invention is so chosen that one of the components or groups of components, is selectively dissolved therein. Furthermore, it should dissolve a sufficient quantity of the preferentially soluble component or group of components at the extraction temperature, preferably at least 10 to 20%.

Both components A and B can be obtained pure only if at the working temperature neither component A or B is wholly miscible with the solvent O. If it is not necessary to separate both components in a pure state, but it is sufficient to produce only one of such component or group of components in a pure state (viz. the one least soluble in the extracting agent), use may be made of an extracting agent which is soluble to a limited extent with one of the components or groups of components, although it is miscible in all proportions with the other component. In the latter case, when operating with the aid of a backwash, the component or group of components preferentially dissolved in the extracting agent can be produced in a more pure state than is possible by means of the known extraction processes, wherein the mixture to be split up is only treated with a solvent in countercurrent, without subsequent treatment (washing) of the extract solution. When comparing these two processes, it will be found that as a result of the present process the extract-component or components is or are obtained in a more pure (more concentrated) state than in the case of applying only a countercurrent extraction.

To illustrate this point, reference may be had to Figures 2 and 3 of the drawing. Considering first Figure 2, it will be seen that this diagram indicates that component A is miscible in all proportions with either B or O, but B and O are only partially miscible with each other at the particular temperature for which the diagram is constructed. If a composition represented by a point lying between B and $E_0$ as, for example, point F is treated with a solvent O, it can be split up into two conjugate phases having compositions represented by points on the binodal curve. In a continuous countercurrent method, for example, it becomes possible to obtain at one end of the extraction apparatus a raffinate phase approaching the composition represented by P, i. e., consisting substantially only of B and O, A being removed from this phase to any desired degree. By removing the solvent O from this ultimate raffinate phase a raffinate consisting of substantially pure B may be obtained. The extract phase produced by this method can be represented by $b_1$, and upon removal of the solvent O from $b_1$ this extract phase would yield an extract of the composition $E_1$. It is seen from this diagram that a solution of the composition V (V is the point of tangency on the curve PVQ of a ray from point O) is capable of yielding an A+B solution having the composition $E_0$, which is richer in the component A than the solution $E_1$. It is also evident that $E_0$ represents the best extract, i. e. the extract having the highest concentration of A, which it is possible to obtain by the extraction of A+B solutions with the solvent O at this particular temperature, regardless of the method employed.

Applying our invention to the illustrative case, wherein an extract phase $b_1$ is withdrawn from an extraction apparatus and the extract $E_1$ is obtained therefrom by removing the solvent, we return a portion of the extract $E_1$ to the extraction process and mix it with the extract phase $b_1$, whereby a mixture M may be produced, consisting of the phases $a_2$ and $b_2$. The raffinate phase is allowed to remain in the extraction process and flow towards the point of introduction of the feed into the process. The new extract phase $b_2$ is withdrawn from the process and the solvent O is removed therefrom, thus yielding an improved extract $E_2$, a portion of which is now returned to the extraction process instead of $E_1$, is mixed with the extract phase $b_2$, formed in the process, yielding a still better extracted phase nearer to V than $b_2$. In this manner, by continually returning a portion of the extract to the process, so that it is effectively contacted with the extract phase produced by an extraction of F with the solvent O, the ultimate extract phase obtained by this process can be improved, made to correspond to the best possible extract, such as V, and its desired composition maintained by regulating the quantity of the returned portion of the extract, which portion has been termed a "backwash". It is not essential that the backwash be entirely solvent-free, as any solution or mixture within the area of $Fa_1b_1b_2VE_0$, for example, which upon being contacted with $b_1$, would yield a mixture having a composition within the area of partial miscibility $a_1b_1b_2Va_2$, can be effectively used as a backwash.

In the case of the miscibility relation illustrated in Figure 2, the first extract $b_1$ obtained after extraction of a mixture F with O is treated with $E_0$, and not with A. A washing with A should be effected only in the case illustrated by Figure 3. In the case of Figure 2, $E_0$ or a similar composition is used, this being the most concentrated solution of A obtainable in the process. It would be unsuitable to wash the extract solution obtained in the extraction process, such as $b_1$ with the pure component A, even if the latter should be available, since a mixture of $b_1$ and A would not give rise to two separate phases. This may be seen by drawing a line between A and $b_1$. This line does not cross the field of limited miscibility $Pa_1a_2Vb_1QP$.

If, in the above situation in which A and O are completely miscible, a composition represented by a point lying between $E_1$ and $E_0$ is treated with the solvent O, it can at once be split up into two phases $a_3$ and V. The latter being the optimum extract phase obtainable on application of the process according to the present invention, it will be evident that in case of extraction of a mixture represented by a point falling on a ray from O which intersects the tie line $a_3$—V. The backwash process mentioned is superfluous, since a countercurrent treatment solely with O may suffice to produce the optimum extract if the correct quantity of solvent is employed, but may be desirable if larger amounts of solvent are used. If the original mixture to be split up does not possess a composition which can be represented by a point situated between B and a point determined by the intersection of a ray from O through $a_3$ with the side AB of the diagram, it is possible to produce such a mixture from the original mixture by adding a component or group of components of the nature of B, i. e. a component or group of components miscible only to a limited extent with the extraction agent O. Such a procedure will, however, be carried out only if the newly added component or group of components, which will be termed B', can be easily separated from B outside the extraction process under discussion and the new mixture to be separated can be split up more easily than the original A+B mixture.

In the case of miscibility relations illustrated in Figure 2 the field of limited miscibility $Pa_1a_2Vb_1QP$ should have a high top. The ideal miscibility relation is obtained when this curve is just tangent to line A—O, although complete separation between A and B may also be obtained if A and O are only partly miscible, as illustrated in Figure 3.

It will be seen that Figure 3 indicates that the component A is miscible in all proportions with the component B, but that the solvent O is only partially miscible with either A or B. The curves RS and TdU constitute the binodal curve, and all compositions represented by points falling within the area between these lines will separate into conjugate phases having compositions represented by points on the binodal curve at opposite ends of the tie lines, as shown.

It can be seen from this diagram that by combining the backwash process with an extraction process it is possible to produce both the raffinate and extract phases so as to approach the compositions R and U, respectively, within any desired degree, and that any A+B solution can be completely separated by extraction and backwashing at this temperature with the solvent O.

The extraction may be carried out with mixtures of solvents. Although it is the intention to carry out the extraction and washing at uniform temperature, it is not necessary that the extraction temperature be identical with the temperature of the washing process.

It is to be understood that in general by extraction in this specification is meant the treatment of the mixture to be split up with the extraction agent or the mixture of the extraction agents. The term "washing" is used for the treatment of the solution of extract in extracting agent or agents with the pure component to be enriched (A) or with a liquid rich in A. If a liquid rich in A is used as washing agent, the other components present in said washing liquid may be either B or a foreign compound. The use of a foreign compound may be necessary if the component A (which is the true washing liquor) should contain or consist of a substance which is solid at the temperature of the washing. In order to be able to act as a washing agent the said component A must be in a liquid condition. According to the invention this may be attained by using a carrier-liquid for A.

In the event of the extraction agent being fed at the top of a column, the washing agent, i. e. the component A or the liquid rich in A, is introduced at the bottom. The component A disappears from the washing agent during the washing. B is taken up and in the end the component B flows off at the top of the column. If a foreign carrier is used for said component, which is the case if A is a solid or has a high viscosity, said carrier may be so chosen that it will also disappear from the washing agent and enter in the extract phase. Also in the latter case only the component B will leave the column at the top.

It will be evident that said carrier may also be added to the original mixture to be split up. Relative to the extraction agent used (O) the carrier therefore must have properties analogous to those of the component A, i. e. it should more readily dissolve the solid component or components A. If the original mixture contains only two chemical compounds, A being the solid, the whole should be turned into a multi-component e. g. into a three-component system. This can be done either before the extraction or at the washing. The newly added compound A' must be separable from A outside the extraction process.

However, it is also possible to use as foreign carrier a liquid which does not enter into the extract phase or only to a limited extent. The carrier then leaves the column together with the component or group of components B. As the extract phase, when flowing through the extraction and washing zones, consists of a solution of varying amounts of A and B in O, it is necessary in the case just mentioned to choose as carrier liquid a solvent or solvent mixture which under the conditions of the extraction (or washing) is not miscible or only miscible to a limited extent with the extract phase mentioned.

In the above the component A has been assumed to be solid. The process is carried out more easily, however, if B is or contains a solid substance. In that case the solid substance never appears as such, the mixture A+B being a liquid, and the solid B passing over from said mixture into the raffinate solution O+B, which is, of course, also a liquid.

If the position is such as is shown in Fig. 2, A being solid, the optimum extract $E_0$, which is used as washing agent, may still be a homogeneous liquid, no extra carrier being required in that case. If it is not a homogeneous liquid a carrier should be used.

From the above it is evident that there is no fundamental difference between the extraction of mixtures containing one or more solids in a dissolved state or mixtures containing only components which are liquid at the washing temperature.

In the process of the invention diluents may be used to lower the viscosity of one of the phases; the above-mentioned carrier liquid for solid components may be considered as such. The said diluents may, however, also affect the extraction efficiency of the process, that is to say they may change the effect of the extraction agent, e. g. diminish its selectivity. According to such an effect some special components, which before the addition of the diluent are not preferably taken up by the extraction agent, now can be extracted by said agent. If, therefore, in a multi-component system, the components of which may be denoted by A $A_1$ $A_2$ $B_1$ and $B_2$ (having progressively lower solubilities in the extracting agent in the order given) a diluent is used together with the extraction agent O, one may obtain a splitting up of the mixture into a product containing A $A_1$ $A_2$ $B_1$ and another product containing $B_2$: whereas without the diluent the mixture is decomposed into A+$A_1$+$A_2$ and $B_1$+$B_2$. In several cases non-polar or slightly polar polarizable compounds have been used with success. Examples are benzene, tetrahydronaphthalene and ether. The diluent may be added to the mixture to be split up or to the extraction agent.

For convenience, the term "component" is used in the appended claims, to designate either of the two portions of any liquid mixture, which portions, in relation to the extraction agent used differ in their solubility characteristics, and can be either separated from or concentrated into each other by extraction with a solvent, so that any such mixture may be considered as containing but two components, regardless of the number of individual chemical substances occurring therein. It will be evident that by the word "component" is meant, not only one chemically pure substance, but that this word covers also a mixture of substances. A component, e. g. A, is said to be pure if it does not contain any portion of a substance which should be present only in the other component (B).

The process may be applied to all kinds of organic substances containing or consisting of polar groups. The mixture may also contain inorganic polar compounds such as water.

Acetic acid can be separated from its aqueous solutions, which may contain other organic polar or non-polar substances e. g. methyl alcohol. The latter is the case with the acetic acid obtained by the distillation of wood.

Organic non-polar compounds preferably should not be present in the mixture to be separated and should be removed beforehand, e. g. terpenes and sesquiterpenes should be removed from essential oils.

Considered chemically, the organic compounds in the mixtures to be treated according to the invention may contain several kinds of atoms such as chlorine, nitrogen, sulphur, etc. or one or more groups containing one or more of these atoms, such as sulpho groups, the nitro group, the aldehyde group, the amino group, the hydroxyl group.

As examples of mixtures to be split up the following may be cited:

1. Glycol and glycol ethers;
2. Isopropyl alcohol, isopropyl acetate and water;
3. Water and chlorhydrin;
4. Ethyl acetate and ethyl alcohol;
5. A glycol-glycerine-water mixture;
6. Methyl alcohol and amyl alcohol;
7. Nitroglycerine and glycerine;
8. Sulpho-acids may be separated from petroleum oils; sulpho-acids may be used as backwash, preferably mixed with another liquid, preferably soluble in the extraction agent used;
9. Glycol and glycol chlorhydrin

($CH_2ClCH_2OH$);

10. Water and acetic acid.

To illustrate the advantage of this process as applied to the separation of water and acetic acid, the following example is presented:

A 5% aqueous solution of acetic acid, which may contain some methyl alcohol, is passed at 25° C. through an extraction tower filled with filling material and is washed there in countercurrent with a two-fold quantity of amyl acetate; the result is a bottom product containing ½% of acetic acid and a top product consisting of 2.2% of acetic acid, 1.8% of water and 96% of amyl acetate, thus corresponding to a concentration of 55% acetic acid.

On the other hand, if at the same temperature 1 part of a 5% acetic acid is introduced in the middle of an extraction column, into which there are introduced at the bottom 2 parts of amyl acetate, whilst at the top one half of the water-acetic acid mixture obtained from the top product (possibly contaminated with some amyl acetate), is reintroduced as reflux, or backwash, then it is possible again to obtain as bottom product a solution containing ½% of acetic acid, whilst as top product there is obtained a solution consisting of 4.5% of acetic acid, 1.5% of water and 94% of amyl acetate, thus corresponding to a concentration of 75% acetic acid. It should be understood that instead of acetic acid also other water-soluble carboxylic acids can be concentrated from their aqueous solutions.

In Example 1, above, pertaining to glycol and glycol ether, diethyl ether can be used as extraction agent, whereas glycol ether (A) is used in the washing process as backwash. In Example 2 benzol can be used as extraction agent; isopropyl acetate is used as component for the backwash.

In Example 3 ethylene chloride is used as extraction agent, chlorhydrin being used as backwash (A). In Example 4 a calcium chloride solution may be used as extraction agent. Alcohol is used as a backwash. In Example 9 diethyl ether or a higher alcohol is used as extraction agent.

Examples 1, 2, 4, 7 and 9 illustrate the fact that the process of the invention may be suitable when applied to the separation of mixtures containing substances, at least one of which is or may be considered as being a derivative of another substance present in the mixture.

In various industrial syntheses such mixtures come into existence, and since in organic syntheses as a rule the final product is not obtained in a 100% yield, it is evident that the process of the invention may be favourably applied to the separation of such mixtures. As examples of this general rule may be mentioned: the separation of chlorine compounds from the corresponding olefines, of chlorine compounds from the corresponding alcohols, of alcohols from the corresponding olefines, of alcohols from the corresponding esters and of fatty acids from the alcohols prepared therefrom by reduction. The derivative or derivatives should preferably possess the same carbon skeleton as the originating substance, the derivatives differing from the original substance either in the number of polar groups or in the intensity of the polar group or groups they contain.

The solvents to be used in the present process, the general properties of which are given in this specification, should be chosen from one of the following groups:

1. Substances which in themselves easily associate;
2. Substances with a very high or a very low internal pressure;
3. Substances which differ greatly in molecular size from the substances to be separated;
4. Substances which in themselves are easily polarizable;
5. Substances which contain strong polar groups.

Suitable solvents in addition to those already mentioned are liquid sulphur dioxide or ammonia, or organic solvents of which the molecules contain one of the following groups:

—$NO_2$, —$CN$, —$SCN$, =$CO$, —$CH_2OH$, =$CHOH$,
=$COH$, =$CCl$ and —$NH_2$.

By the expression "polar compound" as used in the present specification is meant a compound the molecule of which contains one or more polar groups which, when more than one group is present, do not completely neutralize one another's influence on adjacent molecules.

A polar group is one having a dipole moment. (Cf. Debye "The Dipole Moment and Chemical Structure". 1931, page 2.)

We claim as our invention:

1. In a process for extracting a liquid solution of two components containing at least one organic polar compound with a selective solvent, wherein raffinate and extract phases are formed, the steps of recovering an extract from the extract phase by reducing the solvent content of the latter and then contacting the extract phase formed in the process with a portion of the recovered extract.

2. In a process for extracting a two-component liquid solution containing at least one organic polar substance together with at least one polar substance with a selective solvent, wherein raffinate and extract phases are formed, the step of contacting the extract phase with a liquid consisting substantially of the component most readily soluble in the selective solvent.

3. In a process for extracting with a selective solvent a two-component liquid solution containing at least one organic polar substance, and at least one polar derivative of at least one of said organic polar substances, wherein raffinate and extract phases are formed, the step of contacting the extract phase with a liquid consisting substantially of the component most readily soluble in the selective solvent.

4. The process of claim 1 wherein the solution to be separated contains organic substances which differ in the number of the polar groups they contain.

5. The process of claim 1 wherein the solution to be separated contains organic substances which differ in the intensity of the polar groups which they contain.

6. The process of claim 1 wherein the solution to be separated contains organic substances which possess an equal number of polar groups of approximately the same intensity, the molecules of the components being separated being differently polarizable.

7. The process according to claim 1 wherein the selective solvent contains a carrier liquid which is a solvent for one of the components and has solubility characteristics similar to those of the said component.

8. The process of claim 1 wherein the solution to be separated contains at least one substance which is solid at the temperature of the extraction.

9. In the process for extracting a liquid solution of two components containing organic polar compounds which differ in the number of polar groups they contain or in the intensity of the polar groups the steps comprising bringing said solution into contact with a hydrocarbon solvent, thereby forming a heterogeneous mixture of two liquid phases having low and high hydrocarbon content, separating the latter phase, contacting it with a backwash, subsequently described, to produce a second liquid phase having a high hydrocarbon content, treating said second phase having a high hydrocarbon content to reduce its hydrocarbon content, and using a portion of the resulting liquid as the backwash.

10. The process according to claim 9 in which the hydrocarbon solvent is a hydrocarbon containing an aromatic ring.

11. In a process for extracting a solution of an organic polar compound and an inorganic solvent, the steps comprising extracting the said solution with a selective solvent for the organic polar compound to produce a raffinate phase having a low solvent content and an extract phase having a high solvent content, separating said phases, contacting the latter phase with a backwash, subsequently described, thereby forming an improved extract phase, and removing at least a portion of the solvent from said improved extract phase to produce the said backwash.

12. In a process for extracting a two-component liquid solution containing at least one organic polar substance and water with a selective solvent, wherein raffinate and extract phases are formed, the step of contacting the extract phase with a liquid consisting substantially of the component most readily soluble in the selective solvent.

13. In the process for separating a mixture of glycol and a substance selected from the group consisting of glycol ethers and glycol chlorhydrin, the steps comprising extracting the said mixture with diethyl ether at a temperature to produce liquid raffinate and extract phases, the ratio of the concentration of glycol to the concentration of the said selected substance being lower in the extract phase than in the original mixture, separating the said phases, treating the extract phase with a backwash, subsequently described, thereby producing secondary raffinate and extract phases, separating the two secondary phases from each other, and removing at least a portion of the diethyl ether from secondary extract phase to produce the said backwash.

14. In the process for separating a mixture of water and an impure, water-soluble carboxylic acid, the steps comprising extracting the said mixture with a solvent comprising amyl acetate at a temperature to produce liquid raffinate and extract phases, the ratio of the concentration of water to the concentration of carboxylic acid being lower in the extract phase than in the original mixture, separating the said phases, treating the latter phase with a backwash, subsequently described, thereby producing secondary raffinate and extract phases, separating the two secondary phases from each other, and removing at least a portion of the amyl acetate from secondary extract phase to produce the said backwash.

15. In the process for separating a mixture of glycol and a substance selected from the group consisting of glycol ethers and glycol chlorhydrin, the steps comprising extracting said mixture with a selective solvent for said selected substance, under conditions causing the formation of liquid raffinate and extract phases, the ratio of the concentration of glycol to the concentration of the said selected substance being lower in the extract phase than in the original mixture, separating the said phases, treating the latter phase with a backwash liquor consisting predominantly of materials involved in the above described extracting step and containing the said selected substance in a concentration which is greater than the concentration of said selected substance in the extract phase to produce secondary raffinate and extract phases, and separating the two secondary phases from each other.

16. In the process for separating a mixture of water and a water-soluble carboxylic acid other than acetic acid, the steps comprising extracting the said mixture with a selective solvent for the carboxylic acid at a temperature to produce liquid raffinate and extract phases, the ratio of concentration of water to the carboxylic acid being lower in the extract phase than in the original mixture, separating the said phases, treating the extract phase with a backwash consisting predominantly of materials involved in the above described extracting step and containing the carboxylic acid in a greater concentration than its concentration in the said extract phase, thereby producing new raffinate and extract phases, and separating the two new phases from one another.

WILLEM J. D. van DIJCK.
ALEXANDER W. J. MAYER.